(12) United States Patent
Tommassen et al.

(10) Patent No.: US 6,404,867 B1
(45) Date of Patent: Jun. 11, 2002

(54) APPARATUS AND METHOD FOR COLLECTING DATA FROM A REMOTE POINT OF PRESENCE

(75) Inventors: Paul Henricus Hubertus Tommassen, The Hague; Johannes Van Wingerden, Berkel en Roodenrijs; Cornelis Smitshoek, Alblasserdam, all of (NL)

(73) Assignee: Koninklijke KPN N.V. (NL)

( * ) Notice: Subject to any disclaimer, the term of this patent is extended or adjusted under 35 U.S.C. 154(b) by 21 days.

(21) Appl. No.: 09/630,635

(22) Filed: Aug. 1, 2000

(30) Foreign Application Priority Data

Jul. 12, 2000 (EP) .............................................. 00202486

(51) Int. Cl.[7] ........................ H04M 15/00; H04M 1/24; H04M 3/08; H04M 3/22
(52) U.S. Cl. ................. 379/126; 379/1.01; 379/112.01; 379/114.01; 379/115.03
(58) Field of Search ............................... 379/1.01, 1.03, 379/9, 13, 112.01, 114.01, 115.01, 115.03, 126; 714/100

(56) References Cited

U.S. PATENT DOCUMENTS 5,333,183 A * 7/1994 Herbert ....................... 379/112
5,360,680 A * 11/1994 Borbas et al. ................. 379/1
5,768,353 A * 6/1998 Browne ....................... 379/114
5,832,068 A * 11/1998 Smith ......................... 379/113
6,144,726 A * 11/2000 Cross .......................... 379/112
6,198,811 B1 * 3/2001 Klose et al. ................. 379/133

* cited by examiner

*Primary Examiner*—Binh Tieu
(74) *Attorney, Agent, or Firm*—Michaelson & Wallace; Peter L. Michaelson

(57) ABSTRACT

A point of presence with data collecting means (24; 43) arranged for collecting predetermined data and having a first output for outputting said predetermined data at a first transmission rate, the point of presence having forwarding means (22, 28(1), 28(2); 44) with a forwarding means output for outputting data to a dedicated telecommunication network (8) at a second transmission rate differing from said first transmission rate, said point of presence also having feedback means (26(1), 26(2), 26(3), 26(4); 46, 48; 46, 48, 26(5), 52) having a feedback input and a feedback output, said feedback means being arranged to receive said predetermined data at said first transmission rate from said data collecting means (24; 43), said forwarding means (22, 28(1), 28(2); 44) being connected to said feedback output for receiving said predetermined data and forwarding these predetermined data to said dedicated telecommunication network (8) at said second transmission rate.

14 Claims, 4 Drawing Sheets

APPARATUS AND METHOD FOR COLLECTING DATA FROM A REMOTE POINT OF PRESENCE

FIELD OF THE INVENTION

The present invention relates to a point of presence provided with data collecting means arranged for collecting predetermined data and having a first output for outputting the predetermined data at a first transmission rate, the point of presence having forwarding means with a forwarding means output for outputting data to a dedicated telecommunication network at a second transmission rate differing from the first transmission rate.

Such a point of presence, that may be a switching centre, is widely used in the field of telecommunications with centralised support tools and a centralised operation and maintenance organisation.

BACKGROUND OF THE INVENTION

Sometimes points of presence are located a long distance away from a local centre where-data, like maintenance data, operational data and billing data, from these points of presence are to be collected and processed.

Such points of presence are provided with remote digital switches and/or digital multiplexers for collecting and terminating {(inter)national} telephony traffic.

Such switches and multiplexers are arranged to collect for instance maintenance data and to output these maintenance data at many predetermined transmission rates. The predetermination of the transmission rate is depending on the standard transmission speed for a fixed digital channel which is for Europe 64 kbits/s whereas in the United States this transmission rate is 56 kbits/s.

To transmit these maintenance data to the local centre where these maintenance data are processed, these maintenance data could, e.g., be led to an (inter)national private leased circuit (I/NPLC) through a router to guarantee safety of transmission. At the location where the maintenance data is to be processed a further router could be connected to such an (inter)national private leased circuit.

However, installing such routers and using a permanent connection through such an (inter)national Private Leased Circuit (I/NPLC) is rather expensive.

Therefore, it is an object of the present invention to provide a point of presence which allows to transmit such data to the location where the maintenance data needs to be processed in a relatively simple and cheap way.

SUMMARY OF THE INVENTION

To that end, the present invention provides a point of presence as defined above which point of presence is provided with feedback means having a feedback input and a feedback output, the feedback means being arranged to receive the predetermined data at the first transmission rate from the data collecting means, a forwarding means being connected to the feedback output for receiving the predetermined data and forwarding these predetermined data to the dedicated telecommunication network at the second transmission rate.

The invention is based on the insight that, for international as well as national telecommunication, there is already provided a secure and rather cheap dedicated telecommunication network to which the points of presence are connected with. However, this dedicated telecommunication network is operating at another transmission rate which differs from the transmission rate of the data collecting means. Still, it is possible to transmit the data collected by the data collecting means and output them to the dedicated telecommunication network by using, essentially, means already provided for within the point of presence itself. The point of presence itself already comprises forwarding means to forward data to the dedicated telecommunication network at the prescribed second transmission rate. In order to allow said data collected by said data collecting means to be transmitted through this dedicated telecommunication network too, feedback means are provided to feed back the output of the data collecting means to these forwarding means which, then, will automatically forward these data from the data collecting means at the correct transmission rate to the dedicated telecommunication network.

DESCRIPTION OF PREFERRED EMBODIMENTS

Figure 4:
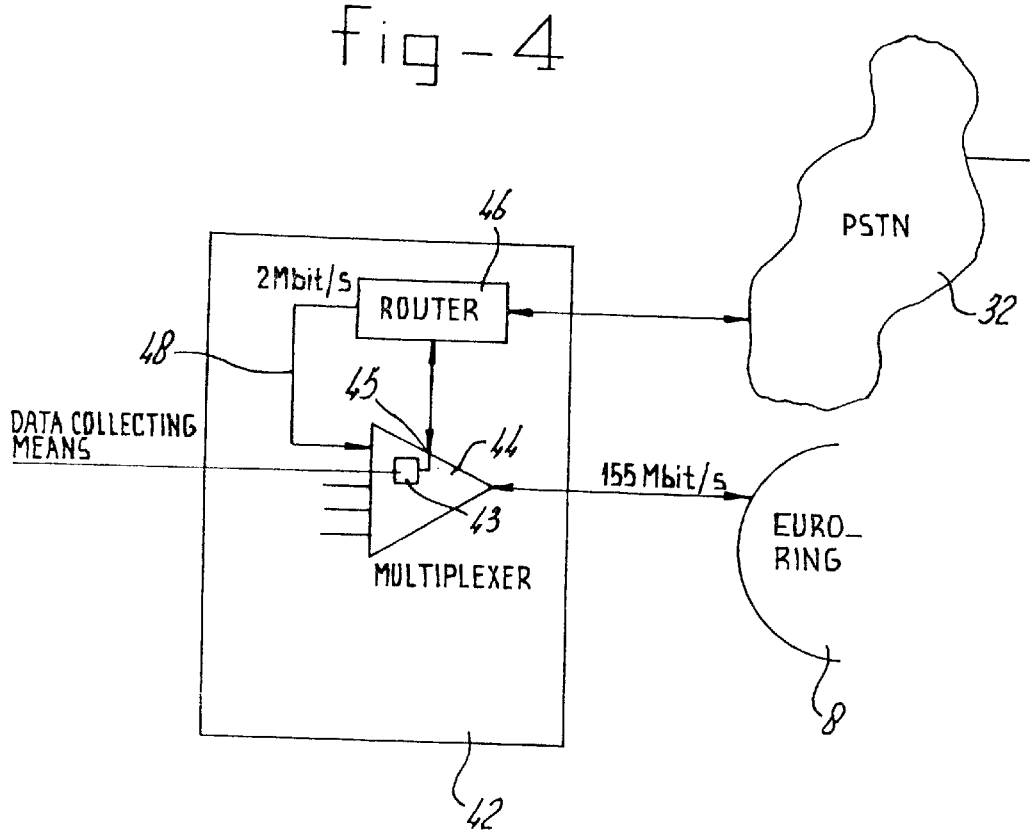
FIG. 4 depicts a second embodiment of the invention implemented in a point of presence having a multiplexer.
Figure 5:
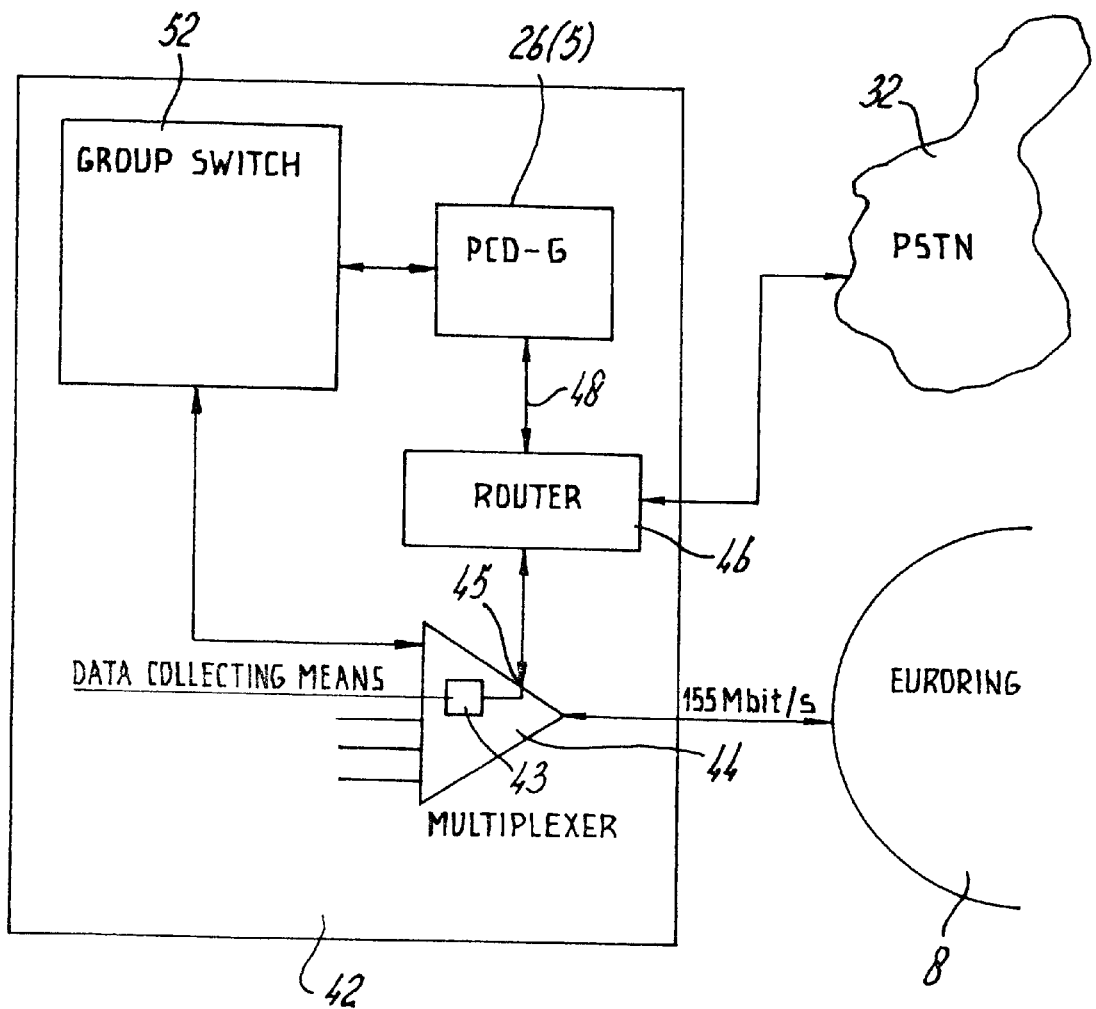
FIG. 5 depicts a point of presence with its multiplexer connected to provide maintenance data.

Below, basically, two different embodiments of the invention will be described, i.e., one in which the point of presence has digital switches (FIGS. 1 and 2) and one in which the point of presence comprises a multiplexer (FIGS. 4 and 5). However, other points of presence may be within the scope of the present invention. Points of presence are, generally, defined as points at which a line from a long distance carrier connects to the line of a local telephone company or to a user if the local telephone company is not involved.

Figure 1:
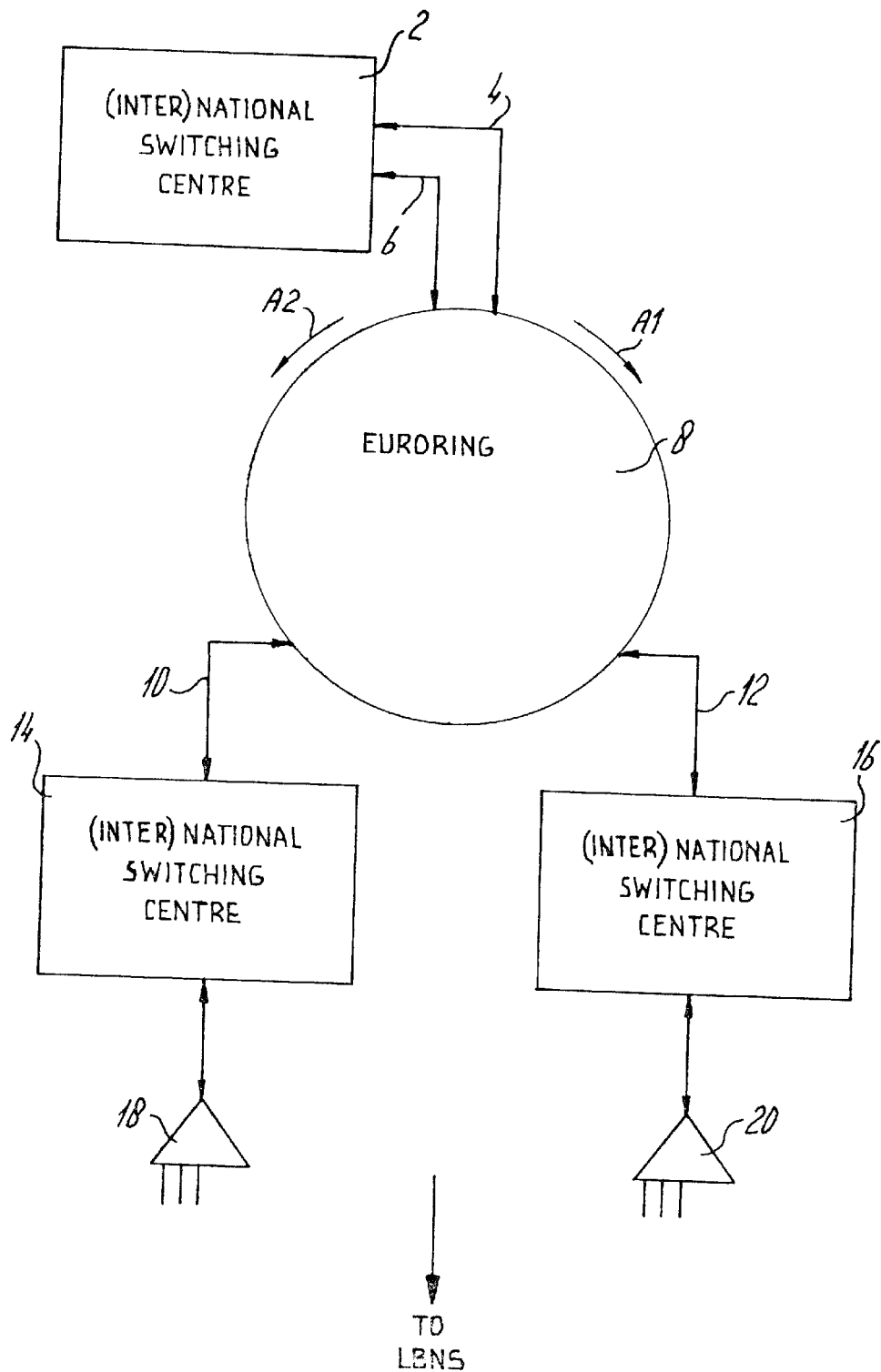
FIG. 1 depicts a first embodiment of the invention implemented in (inter)national switching centre 2 that utilizes digital switches.

In FIG. 1, a first (inter)national switching centre 2 is shown. The (inter)national switching centre 2 is connected to a dedicated, (inter)national telecommunication network 8. This network 8 is termed "dedicated" since one can hire individual, secure channels in this network, that are not accessible to others. An example of such a dedicated, (inter)national telecommunication network is a KPN Euroring structure. There are two separate connections 4, 6 between the (inter)national switching centre 2 and the telecommunication network 8. The first connection 4 is connected to the telecommunication network 8 such that data carried by the first connection 4 will be transmitted clockwise by the telecommunication network 8. The second connection 6 is connected to the telecommunication network 8 such that data carried by the second connection 6 is transmitted by the telecommunication network 8 in an anti-clockwise direction. The clockwise direction is indicated with reference A1 whereas the anti-clockwise direction is indicated with A2. In this way, data can be transmitted redundantly through separate paths physically separated from one another which enhances the security.

It is observed that redundancy could also be achieved by transmitting, normally, either in direction A1 or A2 only and automatically changing to the other direction if the selected direction fails for one reason or the other.

A second (inter)national switching centre 16 is connected to the telecommunication network 8 by means of a connection 12. The (inter)national switching centre 16 is arranged to receive the data/voice transmitted in the clockwise direction through the telecommunication network 8 and to separate the voice and data channels in order to forward the data channels to a local centre where these data is to be processed. This may be done through a local network here indicated with LBNS (LBNS=Landelijk Beheer Netwerk Service), which local network is connected to the Wide Area Network shown in the figures here. This may be done by means of a demultiplexer 20 connected to the output of the (inter)national switching centre 16.

In a similar way, a third (inter)national switching centre 14 is provided which is connected to the telecommunication network 8 by means of a connection 10. Again, the output of the third (inter)national switching centre 14 is connected to the local communication network (LBNS). This may be done through a demultiplexer 18.

With the system shown in FIG. 1, data can be transmitted redundantly to two different (inter)national switching centres 14, 16 located remote from the (inter)national switching centre 2 and arranged to forward the data to a local processing centre.

The object of the present invention is to arrange the (inter)national switching centre 2 such that maintenance data, and other (classified) data, can be received and transmitted by the dedicated telecommunication network 8 to the management systems via the (inter)national switching centre 14, 16 and the demultiplexers 18, 20 to the support systems connected to the LBNS. Although the present data circuits which collect maintenance data, exploitation data and billing data (by means of call detail records) are arranged to output their data on a low rate of for instance 64 kbit/s (in the United States of America 56 kbit/s) and the dedicated telecommunication network 8 transmits data on a much higher rate, e.g. 155 Mbit/s, this can be accomplished in a rather simple way, as will be explained with reference to FIGS. 2, 4 and 5.

Figure 2:
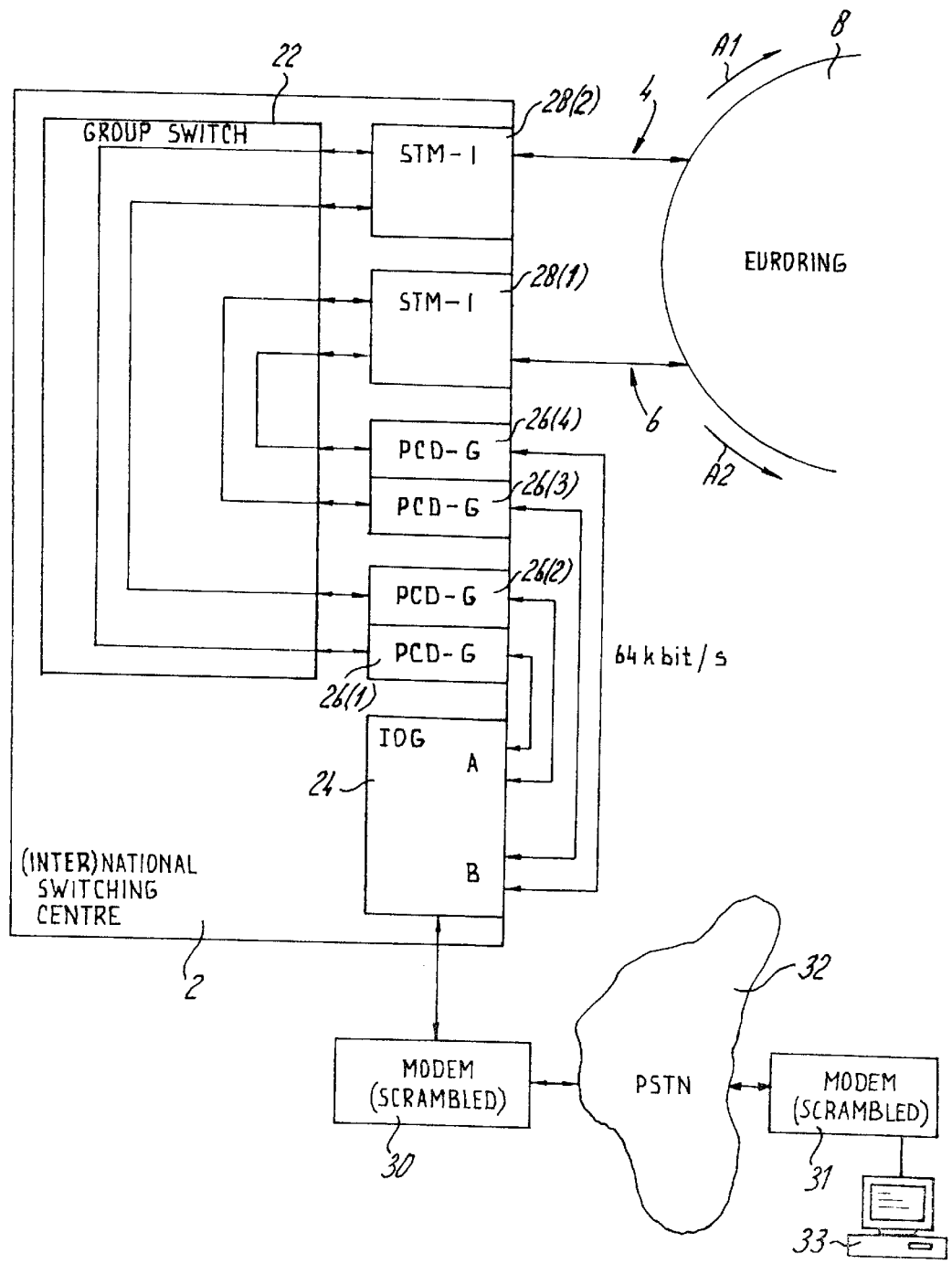
FIG. 2 depicts switching centre 2, shown in FIG. 1, with an interface for collecting maintenance data and possibly operational/billing data.

FIG. 2 shows the (inter)national switching centre 2 having an interface which collects at least maintenance data, and possible operation data and billing data. In FIG. 2, this interface is an input/output group IOG 24 available from Ericsson. The IOG 24 is shown to have two sets of outputs A, B, each set of outputs A, B comprises one output to provide the maintenance and operation data and one output to provide the billing data. Thus, the IOG 24 already provides the relevant data redundantly. It is observed that the names and abbreviations used here and in FIG. 2 relate to components supplied by Ericsson. However, similar components with similar functionality can be obtained from other manufacturers.

The information provided by the IOG 24 needs to be transported to the (inter)national switching centres 14, 16 as these centres are already connected to LBNS. This could be done by providing a router connected to the IOG 24, which router would be connected to an (inter)national private leased circuit I/NPLC (not shown). A further router should, then, be provided connected to the local data network LBNS via which a maintenance system and billing street could be reached. Since such maintenance data and billing data are crucial information such a solution with two routers connected through an (inter)national private leased circuit should be provided twice and physically completely separated in order to guarantee redundancy. Moreover, a maintenance process should also be set up for the routers arranged remote from the local maintenance system and billing street. It should also be noted that the PSTN is no alternative as it should provide a connection around the clock. Such a solution would be rather expensive and is, therefore, not attractive.

In accordance with the present invention, some circuits already available in the (inter)national switching centre 2 are used to couple the maintenance and billing data to the dedicated telecommunication network 8. As shown in FIG. 2, this can be done by a new physical cable connection from each IOG outlet A, B to an individual PCD-G inlet (based upon the international standard G703).

In FIG. 2, it is shown that the outputs of the IOG 24 are fed back to the group switch 22 within the (inter)national switching centre 2 by means of pulse code devices-generic (PCD-G) boards. These PCD-G boards are available from Ericsson and are normally used to connect C7-terminals to the switching centre. The interface for each of the outputs of the IOG 24, as available from Ericsson, is G.703, 64 kbit/s. PCD-G boards are standard provided with a similar interface. Therefore, PCD-G boards can be simply used as a feedback interface for each of the outputs of the IOG 24 to the group switch 22. In FIG. 2, four such PCD-G 26 (1), 26 (2), 26 (3), 26 (4) are shown, one for each output of the IOG 24. If necessary, other numbers of PCD-G boards can be provided.

Semi-permanent paths (SPP's) are set from the PCD-G boards 26(i), i=1, 2, 3, 4, through the group switch 22 and are multiplexed to at least two different higher order levels e.g. STM-1 28(j), j=1, 2 (STM=Synchronous Transport Module). The outputs of the STM-1 28(j) are connected to the dedicated telecommunication network 8, in such a way that at least one of these outputs is directed clockwise in the dedicated telecommunication network 8 and the other one is directed anti-clockwise.

For safety purposes, e.g. when the dedicated telecommunication network 8 entirely fails, the IOG 24 can be connected to the public switched telephone network PSTN 32 through a modem 30 (scrambled). The modem 30 is connected to the IOG 24 of the (inter)national switching centre 2. Locally, where the data is to be collected, the PSTN is connected to, e.g., a personal computer 33 through a further (scrambled) modem 31. Thus, it is possible to dial in with the personal computer 33, in the IOG 24 via the PSTN 32 and to receive the required operation and maintenance data, in case this data cannot be received through the dedicated telecommunication network 8. The billing data can be stored for a period of time on a disk within the IOG 24. The time period is chosen to cover a weekend and the repair time.

The outputs of the PCD-G boards 26(i) provide a 64 kbit/s channel within a 2 Mbit/s connection to the group switch 22. The group switch 22 has a multiplexer to multiplex to a higher order structure for example an STM-1 28(j). The STM-1 28 (j) contains the 64 kbit/s channels at the required rate, e.g. 155 Mbit/s, through the dedicated telecommunication network 8.

As an alternative to the arrangement shown in FIG. 2, the PDG-G's 26(i) could be replaced by additional multiplexers which multiplex signals received from the A and B outputs of the IOG 24 to 2 Mbps and transmit the multiplexed signals to ETC (Exchange Terminal Circuit) ports of the group switch 22. Through the group switch 22 these multiplexed signals are then sent to the STM-1's 28(j) in a way as shown in FIG. 2.

Figure 3:
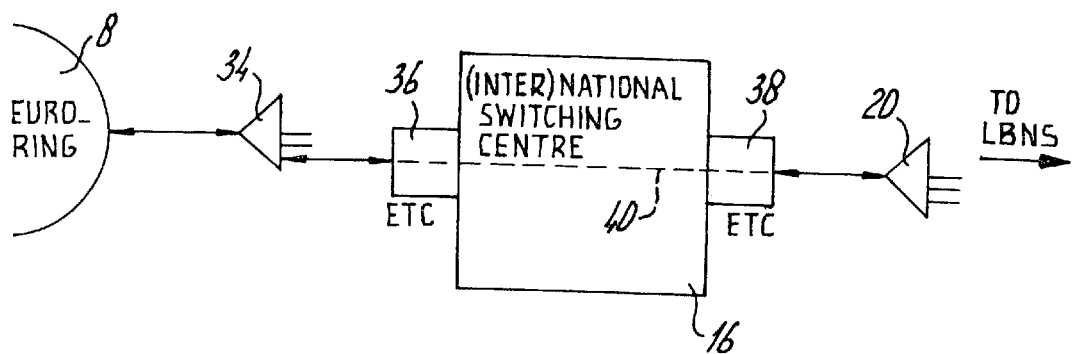
FIG. 3 schematically depicts data transmission from a dedicated telecommunications network, via an (inter)national switching centre, to a local communications network.

FIG. 3 schematically shows the data transmission from the dedicated telecommunication network 8 to the LBNS by means of the (inter)national switching centre 16. The data is received from the dedicated telecommunication network 8 by a demultiplexer, or DXC (digital cross connect) 34 which demultiplexes the 155 Mbit/s link into 2 Mbit/s links. One of the 2 Mbit/s links is connected to an ETC (Exchange Terminal Circuit or E1 interface) at the input of the (inter) national switching centre 16. This 2 Mbit/s link comprises the 64 kbit/s channels with the operation maintenance and billing data. At the output of the (inter)national switching centre 16 a further ETC 38 is provided. In the (inter)national switching centre 16 two semi-permanent paths 40 between ETC's 36, 38 are defined to select the data channels and make a digital path between the IOG 24 and the LBNS. The other channels can be used for ordinary telephony purposes. With this method channels of different ETC's 36 can be defined into only one ETC 38 for connections to the demultiplexer connected to the LBNS. ETC 38 is connected to the demultiplexer 20. This demultiplexer contains a board (for instance a TL-64 G board) capable of demultiplexing the 2 Mbit/s link into (co-directional) G.703 64 kbit/s signals. From here, the interface to LBNS nodes is made. These LBNS nodes are only capable of handling this type of G.703 signals. The (inter)national switching centre 14 (see FIG. 1) may be arranged in a similar way as the (inter)national switching centre 16, as shown in FIG. 3.

Maintenance data from a remote multiplexer can be collected in a similar way, independent of the presence of a switching centre. FIG. 4 explains the situation of a site with only a multiplexer, while FIG. 5 gives the combination of a multiplexer plus switching centre.

FIG. 4 shows a point of presence 42 having a multiplexer 44 which is provided with data collecting means 43 arranged to provide at least maintenance data on a separate output 45. In Europe this output is normally a LAN interface. Again, this data could be transmitted to the local maintenance systems through an (inter)national private leased circuit by means of two routers, as explained earlier or again via an PSTN permanent open connection. However, also in this situation a feedback solution is possible.

FIG. 4 shows that the multiplexer output 45 providing the LAN interface is connected to a router 46. Such a router is present in most cases to forward signals to the PSTN 32 or an IPLC, as is known to persons skilled in the art. The router can also translate the LAN interface to the G703 64 kbit/s interface within a 2 Mbit/s link 48. The router need not be located within the point of presence 42.

In accordance with the present invention, the maintenance data received from the multiplexer 44 is fed back by router 46 to an input of the multiplexer 44 by means of a separate cable 48. In most cases, nowadays, the inputs of the multiplexer 44 are arranged to receive 2 Mbit/s links. The multiplexer 44 is arranged to multiplex all its inputs to one output of, e.g., 155 Mbit/s. Therefore, the router 46 must be arranged to provide the maintenance data received from the multiplexer 44 in a 64 Mbit/s channel of the 2 Mbit/s link 48 connected to the multiplexer 44.

The output of the multiplexer is, normally, not present in redundant form. However, most multiplexers can be configured with a redundancy function changing automatically from a clockwise direction to an anti-clockwise direction in case of a transmission failure in the network 8.

In some other situations, at the location of the multiplexer 44 also a switching centre is installed. Then, a solution corresponding to FIG. 2 can be provided, as shown in FIG. 5. FIG. 5 shows that the multiplexer 44 is connected to the router 46 to provide its maintenance data on a 64 kbit/s link. The router 46 is connected to a PCD-G 26 (5) which is connected to a group switch 52 via semi-permanent paths through the group switch. In the group switch, the 64 kbit/s link is patched into a 2 Mbit/s link which is connected to one of the inputs of the multiplexer 44.

In the arrangement of FIG. 5, the output of the router 46 is for instance a 64 kbit/s link to the PCD-G 26 (5). The output of the PCD-G 26 (5) is a 2 Mbit/s link with 64 kbit/s channels to the group switch 52. The output of the group switch 52 is a 2 Mbit/s link with 64 kbit/s channels to the multiplexer 44. Thus, the maintenance data, received from the multiplexer 44 by the router 46 is fed back to one of the inputs of the multiplexer 44 through the PCD-G 26 (5) and the group switch 52 and multiplexed by the multiplexer 44 itself to the higher rate output link to the dedicated telecommunication network 8.

Thus, with the solutions described above, it is possible to feedback specific data available with a first transmission rate to forwarding means and to forward this specific data to a higher rate dedicated telecommunication network.

It is to be understood, that the transmission rates as specified in the description are intended as examples only and not to limit the scope of protection of the present invention. The scope is only limited by the annexed claims.

What is claimed is:

1. A point of presence provided with data collecting means (24; 43) arranged for collecting predetermined data and having a first output for outputting said predetermined data at a first transmission rate, the point of presence having forwarding means (22, 28(1), 28(2); 44) with a forwarding means output for outputting data to a dedicated telecommunication network (8) at a second transmission rate differing from said first transmission rate, wherein said point of presence is provided with feedback means (26(1), 26(2), 26(3), 26(4); 46, 48; 46, 48, 26(5), 52) having a feedback input and a feedback output, said feedback means being arranged to receive said predetermined data at said first transmission rate from said data collecting means (24; 43), said forwarding means (22, 28(1), 28(2); 44) being connected to said feedback output for receiving said predetermined data and forwarding these predetermined data to said dedicated telecommunication network (8) at said second transmission rate.

2. A point of presence according to claim 1, wherein said predetermined data comprises at least one of maintenance data, billing data and operations data.

3. A point of presence according to claim 1, wherein said data collecting means is an Input/Output Group (24).

4. A point of presence according to claim 1, wherein said forwarding means comprises a group switch (22).

5. A point of presence according to claim 1, wherein said forwarding means comprises at least one Synchronous Transport Module (28(1), 28(2)) having an input connected to an output of said group switch (22).

6. A point of presence according to claim 1, wherein said feedback means comprises at least one Pulse Code Device (26(i), i=1,2,3,4).

7. A point of presence according to claim 1, wherein said data collecting means (24) are also arranged to collect call detail records.

8. A point of presence according to claim 7, wherein said feedback means comprises a separate Pulse Code Device to feedback said call detail records.

9. A point of presence according to claim 1, wherein said data collecting means (24) are also arranged to collect exploitation data.

10. A point of presence according to claim 1, wherein said forwarding means comprises a multiplexer (44).

11. A point of presence according to claim 10, wherein said feedback means comprises a router (46) and a feedback cable (48) connecting an output of said router (46) to an input of said multiplexer (44).

12. A point of presence according to claim 10, wherein said feedback means comprises a router (46) and a group switch (52), the group switch having an input coupled to an output of said router (46), and said group switch having an output coupled to an input of said multiplexer (44).

13. A point of presence according to claim 12, wherein said feedback means comprises a Pulse Code Device (26(5)) connected between said router (46) and said group switch (52).

14. A point of presence according to claim 1, wherein said feedback means and said forwarding means are arranged to output said predetermined data in redundant form to said dedicated telecommunication network.

* * * * *